Aug. 6, 1935.  W. SOKOLOF  2,010,444
FINGER RING GUARD
Filed Nov. 23, 1934
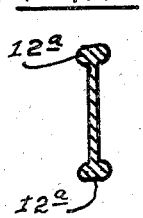
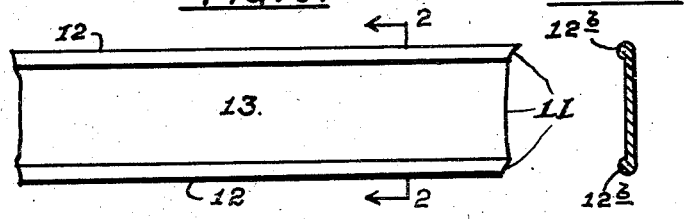
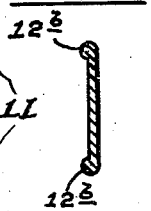
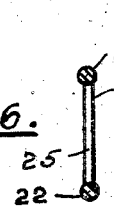
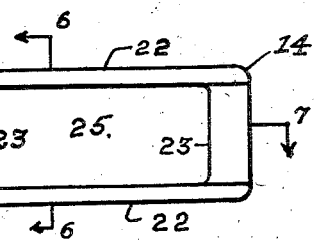
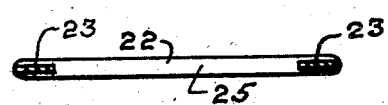
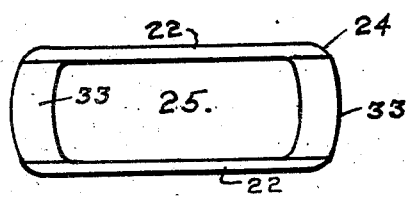
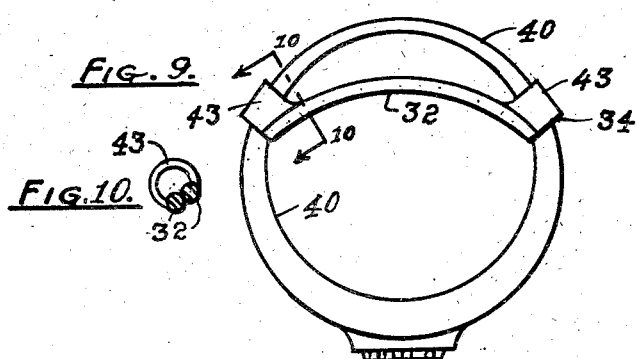
INVENTOR
William Sokolof
BY
Israel Benjamins.
ATTORNEY Patented Aug. 6, 1935

2,010,444

UNITED STATES PATENT OFFICE 2,010,444

FINGER RING GUARD

William Sokolof, Brooklyn, N. Y., assignor to Improved Products Manufacturing Co., New York, N. Y.

Application November 23, 1934, Serial No. 754,387

4 Claims. (Cl. 63—17)

My invention relates to improvements in finger ring guards, and it consists in the novel features which are hereinafter described.

One of the objects of my invention is:—

To produce a finger ring guard which is provided with relatively heavy beam parts for sustaining the pressure which is exerted thereon by the ring finger.

Another object of my invention is:—

To provide a finger ring guard with relatively thin sockets integral with said beam parts, for enclosing therein portions of a ring.

Another object of my invention is to have said finger ring guard jointless and substantially of the same degree of hardness in all its parts.

A further object of my invention is:—

To have the above finger ring guard adapted for mass production.

A still other object of my invention is:—

To have said finger ring guard durable, comparatively simple and inexpensive.

Other objects and advantages will hereinafter appear.

I attain these objects by the finger ring guard and the method of making the same as illustrated in the accompanying drawing of by any mechanical equivalent of obvious modification of the same.

In the drawing Figure 1 is a fragmentary plan view of a strip of metal of a special shape and an indefinite length which is provided for making therefrom blanks for producing my finger ring guards;

Fig. 2 is a cross section on the line 2—2 of Fig. 1; Figs. 3 and 4 are cross sections of modifications of the strip which is shown in Fig. 1;

Fig. 5 is a plan view of a blank formed by punching from the above strip;

Fig. 6 is a cross section on the line 6—6 of Fig. 5, and Fig. 7 is a section on the line 7—7 of Fig. 5;

Fig. 8 is a plan view of a modified form of the above blank with the ends thereof shown as rounded;

Fig. 9 is an elevation of the finished ring guard, which is shown as connected to a ring and may be made from one of the blanks shown in Figs. 5 and 8; and Fig. 10 is a section on the line 10—10 of Fig. 9, looking in the direction of the arrows and omitting the ring.

All the figures of the drawing are made to an enlarged scale.

Like numerals refer to like parts throughout the several views:

11 designates a long strip of metal formed by rolling, as the first step of my method of making finger ring guards. The strip 11 is used as stock for forming therefrom blanks of my finger ring guards.

The strip 11 is provided on the edges thereof with beads or ribs 12, which are relatively heavy, and with a relatively thin web 13 between said beads 12.

The beads 12 are preferably near circular in cross-section, as shown in Fig. 2, and are disposed symmetrically with relation to the web 13.

Other forms of beads are shown in Figs. 3 and 4. In the modification shown in Fig. 3 the cross-section of each of the beads 12a is elongated and has thereon semicircular ends; in the modification shown in Fig. 4 the cross-section of the beads 12b is circular and placed asymmetrically with relation to the web 13.

Other forms of beads may be used, if desired, if they are relatively heavy and have a continuous smooth perimeter.

The next step of my method of forming finger ring guards consists in punching from the stock 11 frame shaped blanks 14 or 24; the former is shown in Figs. 5, 6 and 7 and the latter in Fig. 8.

Each blank 14 or 24 has thereon relatively heavy sides 22, which are formed from the beads 12, 12a or 12b, and relatively thin strap shaped ends 23 or 33, which are formed from the web 13 of the stock 11.

An opening 25 is shown in Figs. 5 and 8 as formed in each of the blanks 14 and 24 by removing a portion of the web 13 of the stock 11 between the beads 12 clear across from bead to bead, leaving the latter with a substantially smooth and continuous perimeter of the cross-section thereof, as shown in Fig. 6.

The ends 23 of the blank 14 are straight, as shown in Fig. 5; the ends 33 of the blanks 24 are curved, as shown in Fig. 8.

The last step of my method of making finger ring guards consists in bending and pressing the blank 14 or 24 into the shape of a finger ring guard 34 which is shown in Figs. 9 and 10; and one or more operations may be employed in this step.

In the finished finger ring guard 34 the sides 22 of the blank 14 or 24 are transformed into a pair of beam parts 32, which are relatively heavy in cross-section, whereby to sustain the pressure exerted thereon by the ring finger; and the ends 23 of the blank 14 or the ends 33 of the blank 24 are transformed into sockets 43 wherein to receive portions of a ring 40.

The beam parts 32 are shown in Fig. 9 as extending to the outer ends of the sockets 43.

The beam parts 32 and sockets 43 are integral with each other and with the ring guard 34 which has no soldered joints or any other joints thereon.

Variations are possible and parts of my invention may be used without other parts.

I claim as my invention and desire to secure by Letters Patent:

1. A finger ring guard comprising a pair of relatively heavy beam parts to sustain the pressure of the ring finger exerted thereon and a pair of relatively thin sockets for receiving therein portions of a ring, said beam parts being made relatively massive in a direction transversely to the plane of the ring as well as in a direction parallel to the plane of the ring and said beam parts and said sockets being integral with each other and with said guard, said guard being jointless and said beam parts and said sockets having substantially the same degree of hardness.

2. A finger ring guard comprising a pair of relatively heavy beam parts, to sustain the pressure of the ring finger exerted thereon, and a pair of relatively thin sockets for receiving therein portions of a ring, said beam parts being relatively massive in a direction transversely to the plane of the ring, said beam parts extending to the outer ends of said sockets, and said beam parts and said sockets being integral with each other and with said guard.

3. A finger ring guard comprising a pair of relatively heavy beam parts, which are substantially circular in cross-section, to sustain the pressure of the ring finger exerted thereon, and a pair of relatively thin sockets for receiving therein portions of a ring, said beam parts and said sockets being integral with each other and with said guard, said guard being jointless and said beam parts extending to the outer ends of said sockets.

4. A finger ring guard comprising a pair of relatively heavy beam parts to sustain the pressure of the ring finger exerted thereon and a pair of relatively thin sockets for receiving therein portions of a ring, said beam parts being relatively massive in a direction transversely to the plane of the ring as well as in a direction parallel to the plane of the ring, said beam parts and said sockets being integral with each other and with said guard and said beam parts extending to the outer ends of said sockets and having each a continuous and substantially smooth perimeter in cross-section.

WILLIAM SOKOLOF.